Jan. 2, 1962     C. J. McLAIN     3,015,568
BAKED DOUGH PACKAGE
Filed May 12, 1958
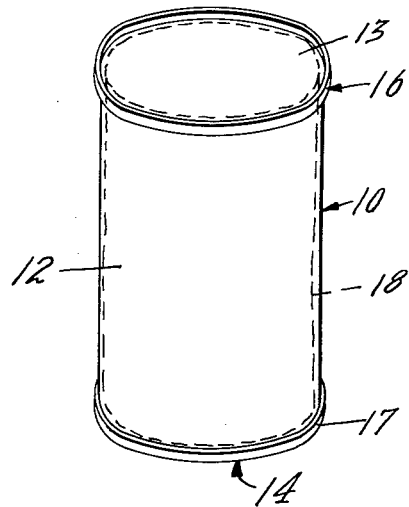
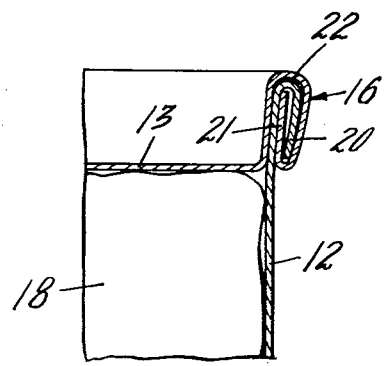
INVENTOR.
CLEMENT J. McLAIN
BY Robert D Auber
George W. Reiber
ATTORNEYS

United States Patent Office 3,015,568
Patented Jan. 2, 1962

3,015,568
BAKED DOUGH PACKAGE
Clement J. McLain, Lombard, Ill., assignor to American Can Company, New York, N.Y., a corporation of New Jersey
Filed May 12, 1958, Ser. No. 734,434
5 Claims. (Cl. 99—172)

The present invention pertains to a novel package and in particular to a package comprising a baked bread or dough-like product in a sheet metal can.

The instant invention will be described hereinafter with reference to bread. However, it is to be understood that the invention is equally applicable to other dough products such as cake, biscuits, etc., which require heating or baking over a period of time to achieve an edible condition.

In many instances, bread and the like must undergo considerable transportation and handling such as in the armed forces. The desirability of packaging such handled and transported bread in rigid, sealed containers, such as a sheet metal can to protect the fragile bread from both physical and chemical damage, is obvious. However, unless the can and product are adequately sterilized and the can hermetically sealed with its interior maintained free of oxygen, the canned bread will deteriorate. Failure to hermetically seal and exclude oxygen permits mold growth and staling of the bread; whereas failure to sterilize adequately could permit the growth in the can of bacteria toxic to humans.

It is therefore an object of the present invention to provide a novel package for bread and the like which protects the bread from physical and chemical deterioration under conditions of severe abuse and/or prolonged storage.

Another object is to provide a package wherein bread and the like are preserved in a fresh, edible condition for long periods of time.

A further object is to provide a package wherein bread and the like are protected from physical and chemical deterioration by being hermetically sealed in a metal can.

Numerous other objects and advantages of the invention will be apparent as it is better understood from the following description which is of a preferred embodiment thereof.

The above objects are achieved by packing bread and the like in a metal can comprising a metal end double seamed onto a metal body using a particular gasket material or sealing compound in the double seam to insure an hermetic seal between the can end and body.

Referring to the drawings:

FIG. 1 is a perspective view of the package in the instant invention with the outline of the baked dough being shown in dotted lines; and FIG. 2 is an enlarged fragmentary view showing the various elements of the instant package.

The can may have any well known construction such as a three piece can composed of a tubular body having a closure member double seamed to each end; or a dished body having a single closure member seamed thereon. Relative to the can construction, it is necessary to the instant invention only that the closure member, which is attached to the body after the can is filled, is attached by means of a double seam.

The particular end lining or gasket compound enclosed within the double seam to provide the necessary hermetic seal comprises essentially a butadiene-acrylonitrile copolymer synthetic rubber combined in specific proportions with two similar but different heat reactive phenolic resins. The gasket compound may contain, and it is preferred that it does contain, other ingredients, such as: reinforcing agents, e.g. zinc oxide; pigments, e.g. titanium dioxide; and fillers, e.g. clay.

The butadiene-acrylonitrile copolymer synthetic rubber, also known in the trade as Buna N and Hycar, is a fat and oil resistant elastomer containing 20% to 55% by weight of acrylonitrile and preferably 40% to 45% by weight of acrylonitrile, the remainder being at least 90% by weight of butadiene. The oil resistance of this material is necessary to prevent attack thereof by the oily or fatty substances, e.g. shortening in the canned bread.

The phenolic resins essential in the end lining compound are both phenol-aldehyde condensation products modified with a cashew nut shell liquid. Each of these phenolic resins are heat reactive in that, upon being heated for a certain time interval, they will further polymerize to an insoluble, infusible solid.

The main difference between these two phenolic resins resides in their degree of polymerization at the time they are incorporated with the synthetic rubber. The phenolic resin present in the larger proportion is a reactive, viscous liquid known commercially as Durez 11953; whereas the phenolic resin used in the lesser amount is a higher molecular weight solid at room temperature known commercially as Durez 12687.

For use in the present invention, the lining or gasket composition contains per part by weight of synthetic rubber, 0.25 to 0.8 part and preferably about 0.4 part of the solid, higher molecular weight phenolic resin; and 0.4 to 1.2 parts and preferably about 0.7 part of the lower molecular weight liquid phenolic resin. The following exemplifies the gasket compound useful in the present invention but is not to be construed as a limitation thereon:

Ingredient:

| | Percent by weight |
|---|---|
| Butadiene-acrylonitrile elastomeric copolymer—Hycar 1042 | 29.70 |
| Liquid phenolic resin—Durez 11953 | 21.53 |
| Solid phenolic resin—Durez 12687 | 12.38 |
| Zinc oxide | 9.90 |
| Titanium dioxide | 5.94 |
| Buca clay | 20.55 |

One of the most efficient means of canning bread and the like comprises placing a predetermined amount of raw dough into an open-ended metal can the interior of which is coated with an edible shortening as a lubricant; loosely crimping an end closure over the open end; and heating the can and contents to an elevated temperature whereby the dough product is baked to its edible state. During the baking operation, the raw dough expands and at the same time releases steam. The combined effects of expansion and steam release purge the interior of the container of air which escapes, along with the steam, between the can body and loosely attached cover therefor. After the baking operation is completed, but while the can and contents are still hot, the can end is securely double seamed onto the body. According to the present invention, the end closure member has disposed in the flange thereof the end lining compound described above, which compound forms the necessary hermetic seal in the double seam.

Ordinary rubbery compositions generally used as end lining or gasket compositions in the double seam of metal cans would tend to become excessively softened by the heat and/or steam present during the baking operation and/or the shortening present in the can. Such a hot, softened compound would have insufficient cohesion to withstand the stress of the double seaming operation whereby it would be squeezed from between the metal surfaces permitting metal-to-metal contact and a resulting leak passage through the seam. This squeezing also results in unsightly and undesirable occurrence of the squeezed-out compound on the outside and/or inside of the can. The heat reactive phenolic resins of the end lining composition used in the instant invention overcome this difficulty apparently by curing, at least partially, to a hardened state under the influence of the heat and steam of the baking operation. It also appears that these reactive phenolic resins have a vulcanizing effect on the butadiene-acrylonitrile elastomer causing it to assume a tough, cohesive state which enables the elastomer to withstand double seaming and to remain continuous throughout the double seam after final attachment of the end closure to the body.

It is believed that the ordinarily solid phenol-aldehyde resin is the one contributing most of the vulcanizing effect on the elastomer since it is already advanced towards the insoluble, infusible state. The main purpose of the normally liquid phenol-aldehyde resin is to act as a plasticizing agent for the combination of elastomer and normally solid phenol-aldehyde resin. Without the addition of the liquid phenolic, the heat cured composition would be too hard and brittle to be of any service as a gasket material between metal surfaces.

An additional advantage of the phenolic resin cured rubber as a gasket material in the package of the instant invention is that it is non-toxic and imparts no off-odors of flavor to the canned product. This result could not be achieved with conventional vulcanizing agents and rubber conditioners such as sulphur compounds, hexamethylene tetramine, Age Rite White (di-Beta-naphthyl-p-phenylene diamine), etc.

As the preferred or exemplary embodiment, FIG. 1 shows a sheet metal can generally designated 10 having a tubular body 12 and closure members 13 and 14 attached to the upper and lower ends respectively of the body 12 by means of conventional double seams 16 and 17. Enclosed within the can 10 is a dough product 18, the outline of which is shown by dotted lines in FIG. 1. This dough product, as has been described hereinbefore, was baked in the can 10 immediately prior to the hermetic sealing of the can.

The upper double seam 16 is composed of interengaged and locked flange members 20 and 21, flange member 20 being formed from the upper periphery of the body 12 and flange 21 being formed from the outer periphery of the closure 13.

Disposed between the interlocked flanges 20 and 21 is the gasket 22 which has been described hereinbefore, and which forms an essential feature of the instant invention. As shown in FIG. 2, the gasket 22 has been advanced toward a cured state by the heat of the baking operation as disclosed previously.

Since the lower closure 14 is applied to the can body 12 before placing the dough product 18 into the can 10 and baking the same, it is not necessary that the bottom double seam 17 contain the special gasket 22. In other words, it is preferred to use a conventional end lining compound in the bottom double seam. However, if desired, the gasket 22 may also be enclosed within the bottom double seam 17.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A package comprising a baked dough product hermetically sealed in a sheet metal can, said can comprising a body member having an end attached thereto by means of a double seam, and a cured gasket consisting essentially of a tough, cohesive butadiene-acrylonitrile elastomer, 0.25 to 0.8 part per part by weight of said elastomer of a normally solid cashew nut shell liquid modified phenol-aldehyde condensation product and 0.4 to 1.2 parts per part by weight of said elastomer of a normally liquid cashew nut shell liquid modified phenol-aldehyde condensation product, said dough product having been baked in said can prior to the double seaming of said end to said body member and said gasket being cured concurrently during the baking of the dough product and before assembly with said body member and said end and enclosed within and sealing said double seam.

2. The package set forth in claim 1 wherein said can comprises a tubular body member having a top closure attached to one end of said body and a bottom closure attached to the opposite end of said body each by means of a double seam.

3. The package set forth in claim 2 wherein said gasket material is enclosed within and seals said top closure member double seam.

4. The package set forth in claim 1 wherein the product is bread.

5. A package comprising bread hermetically sealed in a sheet metal can, said can comprising a tubular body member having a top closure member attached to one end of said body member and a bottom closure member attached to the opposite end of said body member each by means of a double seam, and a cured gasket consisting essentially of a tough, cohesive butadiene-acrylonitrile elastomer, 0.25 to 0.8 part per part by weight of said elastomer of a normally solid cashew nut shell liquid modified phenol-aldehyde condensation product and 0.4 to 1.2 parts per part by weight of said elastomer of a normally liquid cashew nut shell liquid modified phenol-aldehyde condensation product, said dough product having been baked in said can prior to the double seaming of said end to said body member and said gasket being cured concurrently during the baking of the dough product and before assembly with said body member and said end and enclosed within and sealing said double seam.

References Cited in the file of this patent

UNITED STATES PATENTS

| | | |
|---|---|---|
| 2,684,351 | Williams | July 20, 1954 |
| 2,767,152 | Bierman et al. | Oct. 16, 1956 |
| 2,844,502 | Paxton | July 22, 1958 |
| 2,845,356 | Battiste | July 29, 1958 |
| 2,849,148 | Lohuis | Aug. 26, 1958 |

OTHER REFERENCES

Modern Packaging, October 1948, page 206.
Military Specification: Bread Canned MIL-B-1070A, Dec. 7, 1950, pp. 3 and 4.